US012559085B2

(12) United States Patent
Cho

(10) Patent No.: US 12,559,085 B2
(45) Date of Patent: Feb. 24, 2026

(54) TARGET STEERING CONTROL SYSTEM AND METHOD USING BIASED BRAKING POWER IN CASE OF STEERING SYSTEM FAILURE

(71) Applicant: HL MANDO CORPORATION, Gyeonggi-do (KR)

(72) Inventor: Youngeun Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 270 days.

(21) Appl. No.: 18/213,830

(22) Filed: Jun. 24, 2023

(65) Prior Publication Data

US 2024/0308494 A1      Sep. 19, 2024

(30) Foreign Application Priority Data

Mar. 16, 2023      (KR) ......................... 10-2023-0034466

(51) Int. Cl.
| | |
|---|---|
| *B60W 10/22* | (2006.01) |
| *B60W 10/18* | (2012.01) |
| *B60W 10/20* | (2006.01) |
| *B60W 40/114* | (2012.01) |
| *B60W 50/029* | (2012.01) |

(52) U.S. Cl.
CPC ............ *B60W 10/22* (2013.01); *B60W 10/18* (2013.01); *B60W 10/20* (2013.01); *B60W 40/114* (2013.01); *B60W 50/029* (2013.01); *B60W 2520/14* (2013.01); *B60W 2540/18* (2013.01)

(58) Field of Classification Search
CPC ...... B60W 10/22; B60W 10/18; B60W 10/20; B60W 40/114; B60W 50/029; B60W 2520/14; B60W 2540/18
USPC ......................................................... 701/48
See application file for complete search history.

(56) References Cited

U.S. PATENT DOCUMENTS

| | | | | | |
|---|---|---|---|---|---|
| 3,240,299 | A | * | 3/1966 | Buchwald ................ | G05G 1/60 477/211 |
| 3,544,870 | A | * | 12/1970 | Muller ................... | G01R 23/02 318/799 |
| 4,482,961 | A | * | 11/1984 | Kilner .................. | G05D 1/0083 701/16 |
| 6,209,972 | B1 | * | 4/2001 | Matsuno ............... | B60T 8/1755 303/146 |
| 6,360,150 | B1 | * | 3/2002 | Fukushima ......... | B60T 8/17552 701/41 |
| 6,453,226 | B1 | * | 9/2002 | Hac ........................ | B62D 7/159 180/41 |
| RE46,828 | E | * | 5/2018 | Spillane ................ | B60W 10/06 |
| 10,589,738 | B1 | * | 3/2020 | Boecker ................ | B60W 30/02 |

(Continued)

*Primary Examiner* — Logan M Kraft
*Assistant Examiner* — John D Bailey
(74) *Attorney, Agent, or Firm* — WOMBLE BOND DICKINSON (US) LLP

(57) ABSTRACT

According to the present disclosure, there is an effect in that a braking control unit controls a braking actuator of a vehicle and biased-brakes the vehicle in order to satisfy a target biased braking torque by receiving a target biased braking torque value calculated by an integrated control unit, and when biased braking power is generated in a vehicle by the braking control unit, a suspension control unit receives a signal from the integrated control unit to control a height of a suspension to be increased in order to reduce a yaw motion of the vehicle.

14 Claims, 8 Drawing Sheets

(56) References Cited

U.S. PATENT DOCUMENTS

| | | | | |
|---|---|---|---|---|
| 2003/0149515 A1* | 8/2003 | Hessmert | B60T 8/17551 | |
| | | | 701/1 | |
| 2003/0200016 A1* | 10/2003 | Spillane | B60K 28/16 | |
| | | | 701/36 | |
| 2005/0057095 A1* | 3/2005 | Hac | B60T 8/885 | |
| | | | 303/122 | |
| 2005/0125153 A1* | 6/2005 | Matsumoto | B60T 8/17557 | |
| | | | 701/41 | |
| 2005/0216157 A1* | 9/2005 | Sakata | B60T 8/1755 | |
| | | | 701/41 | |
| 2006/0253240 A1* | 11/2006 | Rao | B60W 50/035 | |
| | | | 701/1 | |
| 2009/0253547 A1* | 10/2009 | Niva | B60K 17/348 | |
| | | | 180/250 | |
| 2009/0254250 A1* | 10/2009 | Koo | B60W 30/18145 | |
| | | | 701/37 | |
| 2009/0265147 A1* | 10/2009 | Dixit | B60W 30/16 | |
| | | | 703/2 | |
| 2011/0307129 A1* | 12/2011 | Yu | B60W 30/02 | |
| | | | 701/22 | |
| 2012/0072050 A1* | 3/2012 | Naka | B60W 30/0956 | |
| | | | 701/1 | |
| 2013/0030651 A1* | 1/2013 | Moshchuk | B60W 30/09 | |
| | | | 701/41 | |
| 2014/0046564 A1* | 2/2014 | Matsuno | B60K 17/3515 | |
| | | | 701/69 | |
| 2014/0088833 A1* | 3/2014 | Matsuno | B60W 30/045 | |
| | | | 701/41 | |
| 2015/0298694 A1* | 10/2015 | Park | B60W 10/04 | |
| | | | 701/41 | |
| 2017/0137023 A1* | 5/2017 | Anderson | B60W 50/14 | |
| 2019/0023264 A1* | 1/2019 | Mizutani | B60T 8/1755 | |
| 2019/0054916 A1* | 2/2019 | Akiyama | B60G 17/016 | |
| 2019/0217854 A1* | 7/2019 | Park | B60W 30/045 | |
| 2019/0270444 A1* | 9/2019 | Park | B60W 10/18 | |
| 2020/0321893 A1* | 10/2020 | Hossain | B62D 5/046 | |
| 2020/0324649 A1* | 10/2020 | Gully | B60W 10/14 | |
| 2021/0086737 A1* | 3/2021 | Schumann | B60T 8/1755 | |
| 2021/0188252 A1* | 6/2021 | Lu | B60W 40/12 | |
| 2021/0213935 A1* | 7/2021 | Lu | B60C 23/04 | |
| 2021/0269030 A1* | 9/2021 | Uemura | B60W 30/165 | |
| 2021/0331663 A1* | 10/2021 | Newton | G06N 3/08 | |
| 2022/0080838 A1* | 3/2022 | Hwang | B60W 40/101 | |
| 2022/0111895 A1* | 4/2022 | Schumann | B60W 40/114 | |
| 2022/0306068 A1* | 9/2022 | Shin | B62D 15/0285 | |
| 2023/0182579 A1* | 6/2023 | Koga | B60W 10/20 | |
| | | | 303/152 | |
| 2024/0308485 A1* | 9/2024 | Schumann | B62D 7/228 | |

* cited by examiner

[FIG.1]
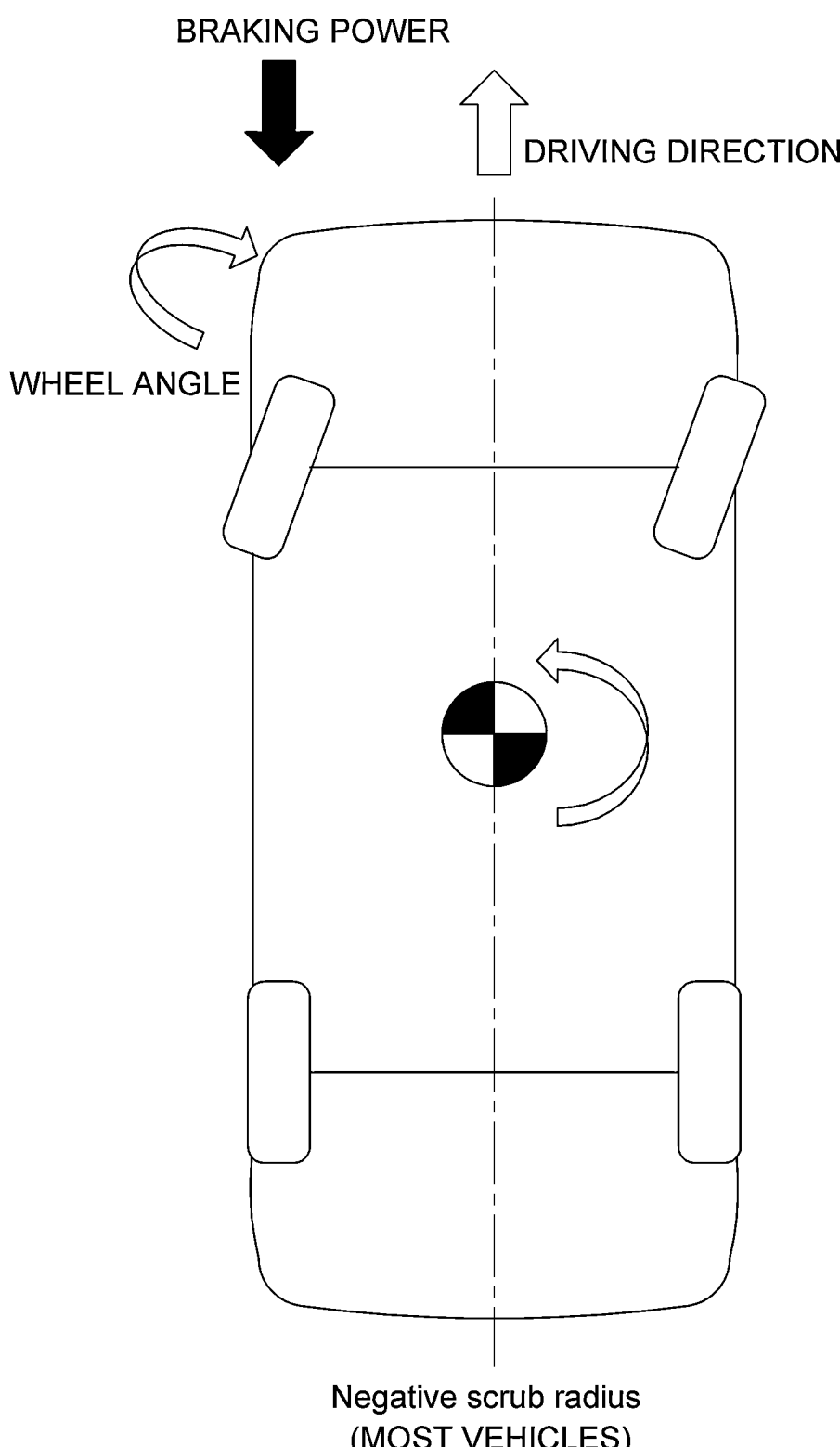
BRAKING POWER
DRIVING DIRECTION
WHEEL ANGLE
Negative scrub radius
(MOST VEHICLES)

[FIG.2]
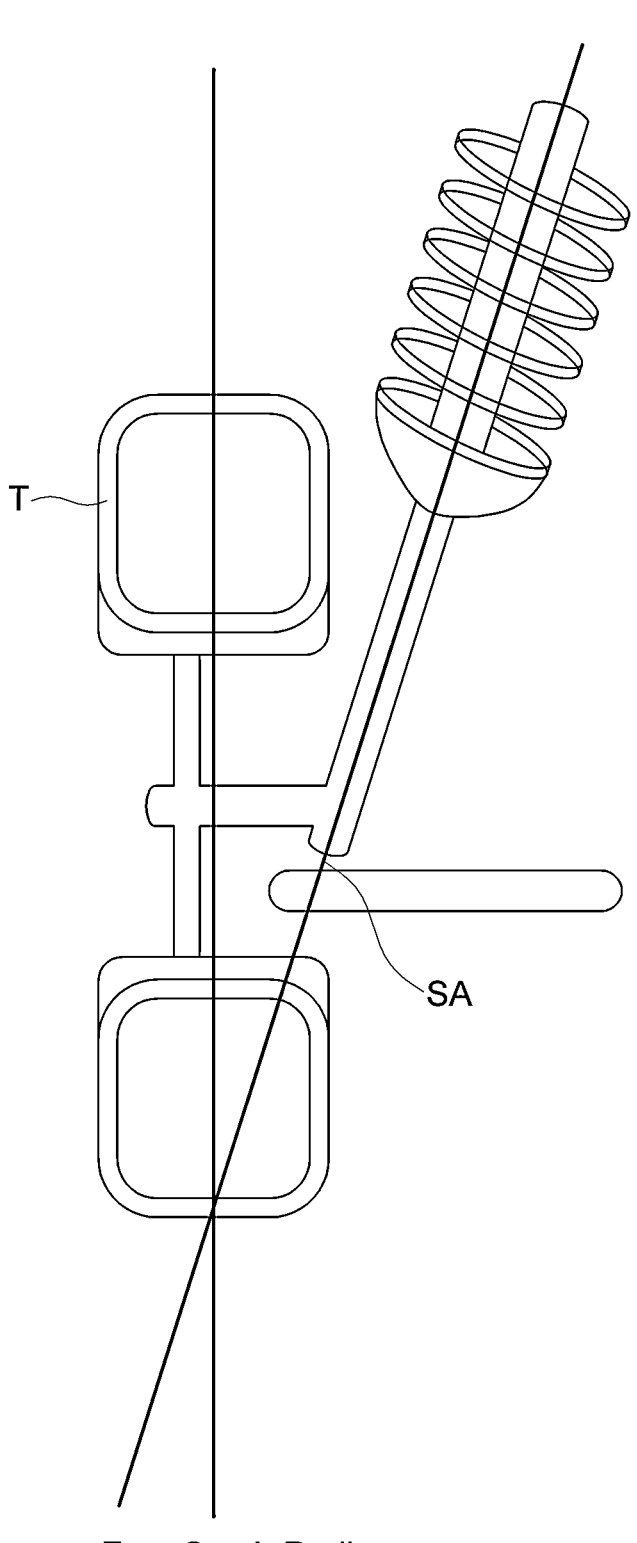
Zero Scrub Radius

[FIG.3]
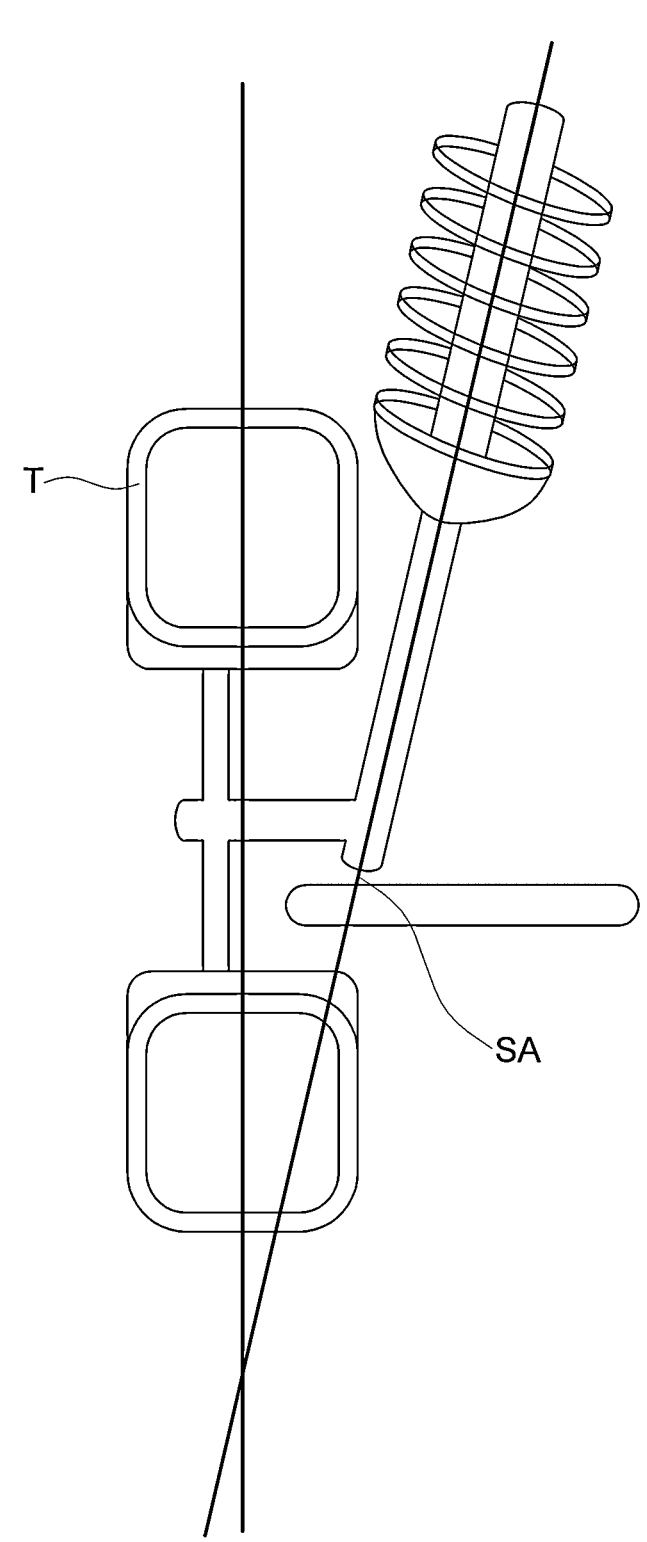
Positive Scrub Radius

[FIG.4]
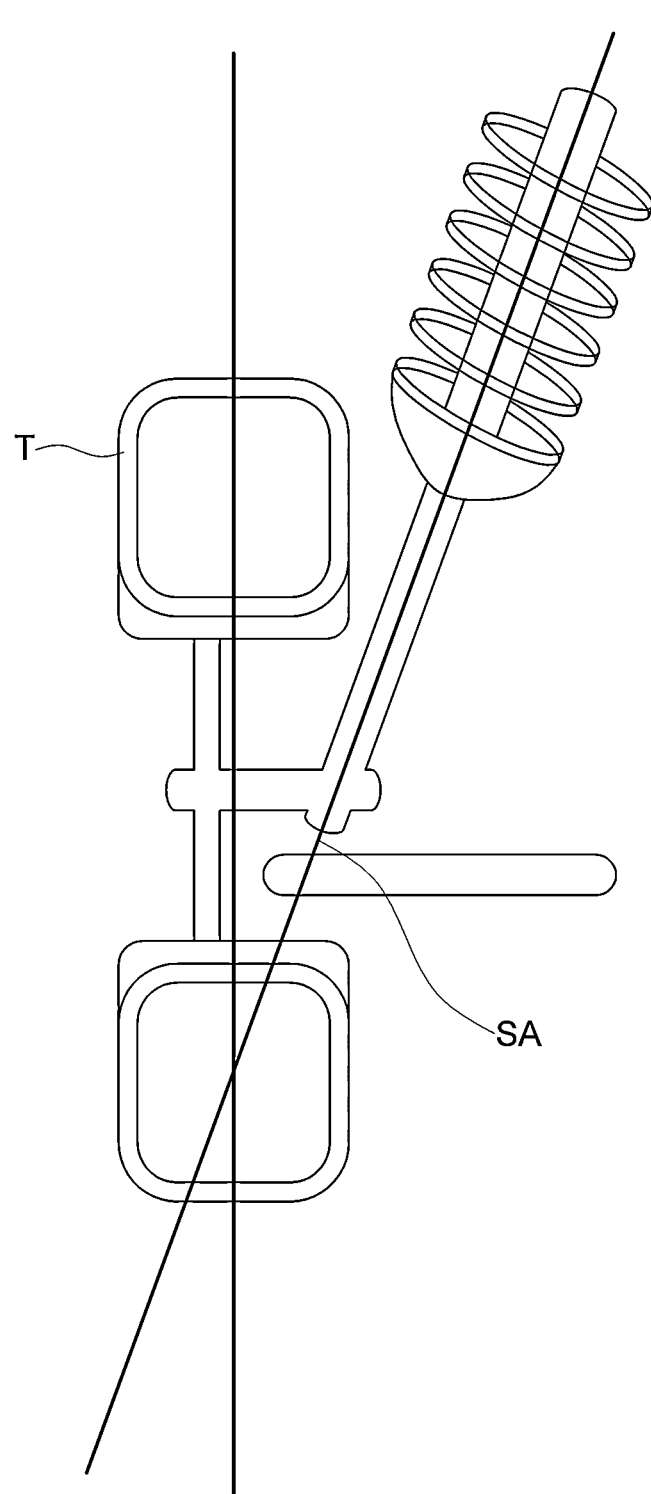
Negative Scrub Radius

[FIG.5]
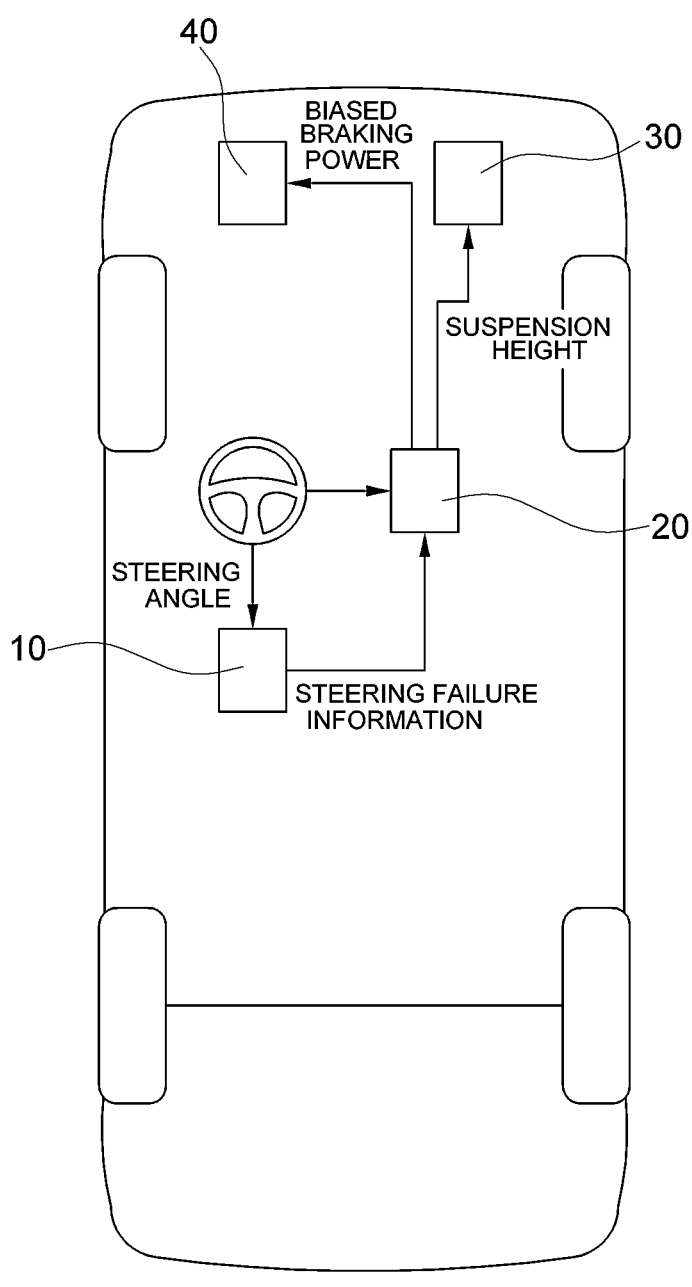

[FIG.6]
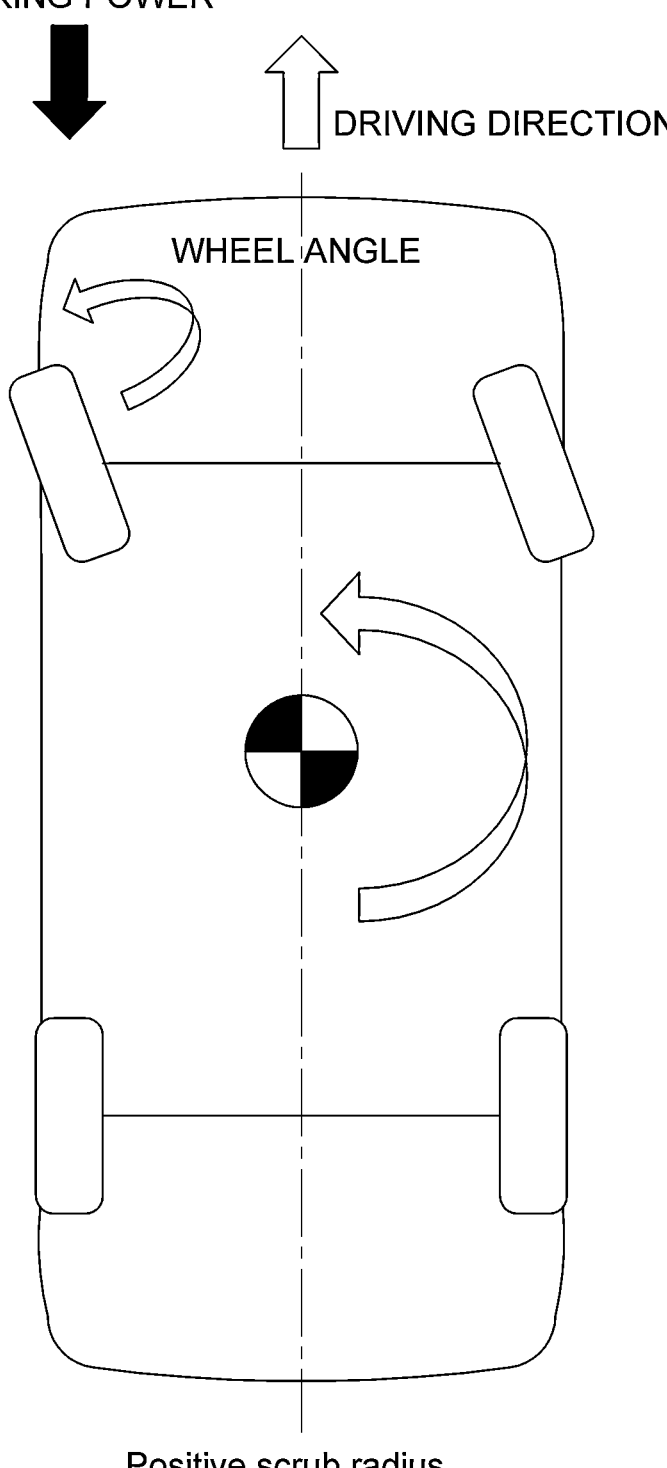
BRAKING POWER
DRIVING DIRECTION
WHEEL ANGLE
Positive scrub radius

[FIG.7]
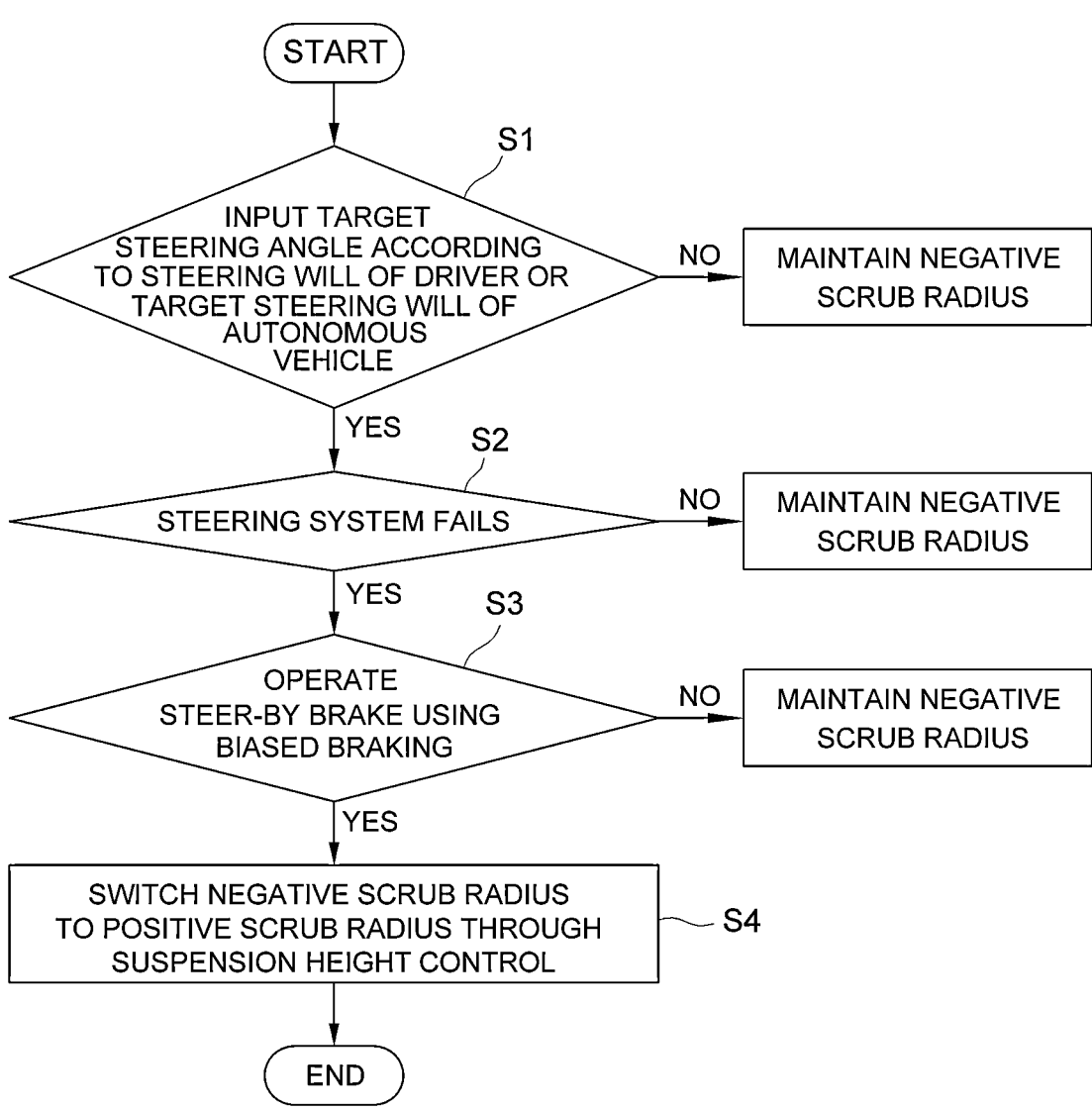

[FIG.8]
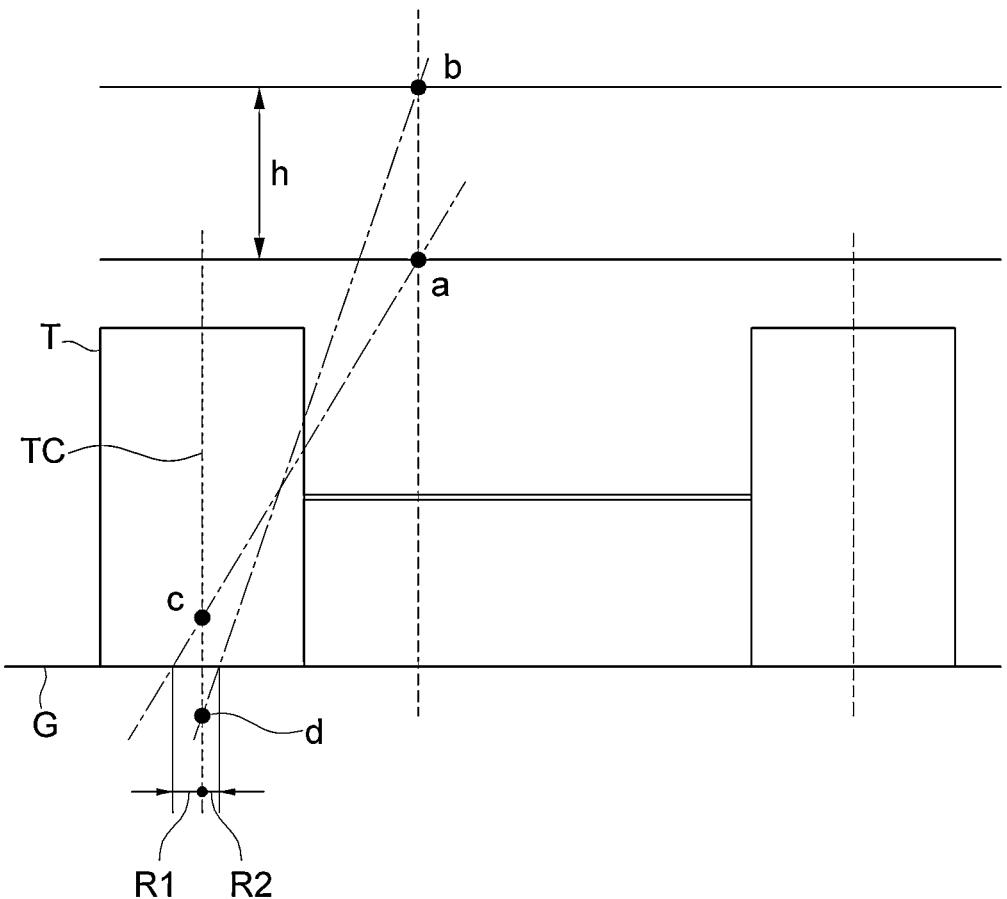

TARGET STEERING CONTROL SYSTEM AND METHOD USING BIASED BRAKING POWER IN CASE OF STEERING SYSTEM FAILURE

CROSS-REFERENCE TO RELATED APPLICATIONS

This application claims priority under 35 U.S.C. § 119 to Korean Patent Application No. 10-2023-0034466, filed on Mar. 16, 2023, in the Korean Intellectual Property Office (KIPO), the disclosure of which is incorporated by reference herein in its entirety.

TECHNICAL FIELD

The present disclosure relates to a system and a method for target steering control using biased braking power in case of a steering system failure, and particularly, to a system and a method for target steering control using biased braking power in case of a steering system failure, which can stably emergently steer a vehicle using the biased braking power when a steering system of the vehicle has a failure.

BACKGROUND

Recently, 'BY-Wire' technology has been actively developed worldwide as a next-generation vehicle technology.

In an automotive sector, as the 'BY-Wire' technology is mainly applied to and developed in steering system and braking system sectors, and the 'BY-Wire' technology is emerging as an element that will make a big change in automobile manufacturing technology.

In the steering system sector, 'Steer-by-Wire' technology is being developed, which steers an automobile by using electric power of a motor or a sensor without a mechanical connection.

When the 'Steer-by-Wire' technology is applied, a steering column which is a central axis of the existing steering is not required, so horizontal switching of a wheel is much easier and an injury risk of a driver can be significantly reduced upon a collision by electronic steering.

In the braking system sector, 'Brake-by-Wire' technology is applied, which switches and controls the existing hydraulic control system into an electrical control system, and can actively control a brake independently for each of 4 wheels.

However, since such a by-wire product and a manipulation (adjustment) means of the driver are connected only by a wire, when an error occurs in the system, there is no method for the driver to control the automobile.

Therefore, when the by-wire product has a failure, the necessity for a redundancy device capable of complementing the failure has emerged.

In particular, in the case of a steer-by-wire steering system, when a problem occurs in communication, and a target steering signal of a steering manipulation or autonomous vehicle of the driver is not delivered to an actuator, a steering performance is lost 100%.

This can lead to a big accident, so the necessity of a redundancy function in the steer-by-wire steering system is more urgently required.

Meanwhile, in the related art, technology is developed, which follows the target steering signal by biased braking power utilizing a brake system when the steering system has the failure.

FIG. 1 is a diagram illustrating a state in which a negative scrub radius is applied when bias braking power is applied to a vehicle.

In automakers, when the biased braking power is applied to the vehicle upon designing the vehicle, a suspension geometry is generally designed so that a wheel angle rotates in an opposite direction to a yaw motion which occurs in the vehicle for stability of the vehicle.

That is, in most vehicles, a negative scrub radius is applied, which allows the wheel to be steered from the outside to the inside by the biased braking power when the biased braking power is applied.

When the wheel angle is generated in the opposite direction to the yaw motion which occurs in the biased braking power, the yaw motion itself is reduced and a horizontal movement distance is reduced.

As a result, the stability of the vehicle can be secured by reducing the yaw motion upon biased braking, but there is a problem that there is no emergency steering, such as moving the vehicle to a shoulder of a road when the steering system fails.

As a result, development of technology is urgent, which can enhance a conformability of a target steering direction by using the biased braking power and secure the stability of the vehicle when the steering system fails.

SUMMARY

The present disclosure is contrived to solve various problems in the related art, and has been made in an effort to provide a system and a method for target steering control using biased braking power in case of a steering system failure, which can stably emergently steer a vehicle using biased braking power without a need for a separate mechanical device in case of a failure of a steering system of a vehicle.

An exemplary embodiment of the present disclosure provides a system for target steering control using biased braking power in case of a steering system failure, which includes: a steering control unit controlling a steering system by receiving information on a steering angle according to a steering will of a driver or a target steering will of an autonomous vehicle; an integrated control unit receiving steering failure information of the steering system from the steering control unit, input with the target steering angle from the steering wheel of the driver or the autonomous vehicle, and calculating a target biased braking torque value for satisfying the target steering angle when the steering system fails; a braking control unit receiving the target biased braking torque value calculated by the integrated control unit, and biased-braking a vehicle by controlling a braking actuator of the vehicle in order to satisfy the target biased braking torque; and a suspension control unit receiving a signal from the integrated control unit and controlling a height of a suspension to be increased when biased braking power is generated in the vehicle by the braking control unit in order to reduce a yaw motion of the vehicle.

When the steering system is in a normal state, a negative scrub radius is maintained.

When the steering system is in a failure state, if the height of the suspension is increased by the suspension control unit, a negative scrub radius is switched to a positive scrub radius.

The steering control unit, the integrated control unit, the braking control unit, and the suspension control unit are preferably configured by an electronic control unit (ECU).

When the integrated control unit is input with the target steering angle from the steering wheel of the driver or the autonomous vehicle, the integrated control unit calculates a target yaw moment of the vehicle for judging how the vehicle should be rotated in order to emergently steer the vehicle.

The target yaw moment of the vehicle is calculated by using a 3-degree of freedom transverse vehicle dynamic state spatial model equation.

When the target yaw moment of the vehicle is calculated, the integrated control unit calculates which degree the biased braking power required for the vehicle is by the following equation.

$$\text{Biased braking power} = \frac{\text{Vehicle target yaw moment}}{\frac{\text{Vehicle width}}{2}}$$

The integrated control unit calculates each of a braking torque of a front wheel and a rear wheel at one side of the vehicle according to the target yaw moment.

The braking control unit controls the operation of the braking actuator that brakes each of the front wheel and the rear wheel according to braking torque values of the front wheel and the rear wheel transmitted from the integrated control unit.

The braking control unit and the braking actuator may be provided for each wheel.

As another configuration, there may be provided a target steering control system using biased braking power in case of a steering system failure, which generates a target biased braking torque by receiving a target steering angle to follow up a target steering of a driver or an autonomous vehicle in case of a steering system failure, in which when the steering system is in a normal operation state, the target steering control system maintains a negative scrub radius; and reduces the negative scrub radius by increasing the height of the suspension and gradually switches the scrub radius to the positive scrub radius when controlling the yaw motion of the vehicle using the biased braking power when the steering system is in a failure state.

As yet another configuration, there may be a system for target steering control using biased braking power in case of a steering system failure, the system comprising: a steering control unit controlling a steering system by receiving information on a steering angle according to a steering will of a driver or a target steering will of an autonomous vehicle; an integrated control unit receiving steering failure information of the steering system from the steering control unit, input with the target steering angle from the steering wheel of the driver or the autonomous vehicle, and calculating a target biased braking torque value for satisfying the target steering angle when the steering system fails; a braking control unit receiving the target biased braking torque value calculated by the integrated control unit, and biased-braking a vehicle by controlling a braking actuator of the vehicle in order to satisfy the target biased braking torque; and a suspension control unit receiving a signal from the integrated control unit and controlling a height of a suspension to be increased when biased braking power is generated in the vehicle by the control of the braking control unit in order to reduce a yaw motion of the vehicle, in which when the steering system is in a normal operation state, maintaining a negative scrub radius; and the negative scrub radius is reduced by increasing the height of the suspension and the scrub radius is gradually switched to the positive scrub radius when controlling the yaw motion of the vehicle using the biased braking power when the steering system is in a failure state.

Another exemplary embodiment of the present disclosure provides a method for target steering control using biased braking power in case of a steering system failure, the method comprising: a first step of inputting a target steering angle according to a steering will of a driver or a target steering will of an autonomous vehicle into an integrated control unit; a second step of delivering steering failure information of a steering system from a steering control unit to an integrated control unit, and judging, by the integrated control unit, whether the steering system fails; a third step of operating, by a braking control unit receiving a signal from the integrated control unit, a steer-by-brake using biased braking when the steering system fails in the second step; and a fourth step of switching a negative scrub radius to a positive scrub radius through suspension height control by control of a suspension control unit by receiving the signal from the integrated control unit when the biased braking power occurs in a vehicle by the braking control unit.

The integrated control unit is input with the target steering angle from the steering wheel of the driver or the autonomous vehicle, and calculates the target biased braking torque value for satisfying the target steering angle.

The braking control unit receives the target biased braking torque value calculated by the integrated control unit, and biased-brakes a vehicle by controlling a braking actuator of the vehicle in order to satisfy the target biased braking torque.

In the first step, if the target steering angle is not input into the integrated control unit, the negative scrub radius is maintained.

In the second step, when the integrated control unit judges that the steering system does not fail, the negative scrub radius is maintained.

In the third step, when the braking control unit does not operate steer-by-brake using biased braking, the negative scrub radius is maintained.

As an alternative, the present disclosure may provide a target steering control method using biased braking power in case of a steering system failure, which generates a target biased braking torque by receiving a target steering angle to follow up a target steering of a driver or an autonomous vehicle in case of a steering system failure, which includes: when the steering system is in a normal operation state, maintaining a negative scrub radius; and reducing the negative scrub radius by increasing the height of the suspension and gradually switching the scrub radius to the positive scrub radius when controlling the yaw motion of the vehicle using the biased braking power when the steering system is in a fail state.

As another alternative, the present disclosure may also provide a method for target steering control using biased braking power in case of a steering system failure, the method comprising: controlling a steering system, by a steering control unit, by receiving information on a steering angle according to a steering will of a driver or a target steering will of an autonomous vehicle; receiving, by an integrated control unit, steering failure information of the steering system from the steering control unit, input with the target steering angle from the steering wheel of the driver or the autonomous vehicle, and calculating a target biased braking torque value for satisfying the target steering angle when the steering system fails; receiving, by a braking control unit, the target biased braking torque value calculated by the integrated control unit, and biased-braking a vehicle by controlling a braking actuator of the vehicle in order to satisfy the target biased braking torque; and receiving, by a suspension control unit, a signal from the integrated control unit and controlling a height of a suspension to be increased when biased braking power is generated in the vehicle by the control of the braking control unit in order to reduce a yaw motion of the vehicle, in which when the steering system is in a normal operation state, a negative scrub radius is maintained; and the negative scrub radius is reduced by increasing the height of the suspension and the scrub radius is gradually switched to the positive scrub radius when controlling the yaw motion of the vehicle using the biased braking power when the steering system is in a failure state.

Specific details of other embodiments are included in "Details for carrying out the invention" and accompanying "drawings".

Advantages and/or features of the present disclosure, and a method for achieving the advantages and/or features will become obvious with reference to exemplary embodiments to be described below in detail together with the accompanying drawings.

However, the present disclosure is not limited to the exemplary embodiments set forth below, and may be embodied in various different forms. The present embodiments are just for rendering the disclosure of the present disclosure complete and are set forth to provide a complete understanding of the scope of the invention to a person with ordinary skill in the technical field to which the present disclosure pertains, and the present disclosure will only be defined by the scope of the claims.

According to the solving means of the problem, the present disclosure has the following effects.

According to an exemplary embodiment of the present disclosure, there is an effect in that a braking control unit controls a braking actuator of a vehicle and biased-brakes the vehicle in order to satisfy a target biased braking torque by receiving a target biased braking torque value calculated by an integrated control unit, and when biased braking power is generated in a vehicle by the braking control unit, a suspension control unit receives a signal from the integrated control unit to control a height of a suspension to be increased in order to reduce a yaw motion of the vehicle, thereby stably emergently steering the vehicle using biased braking power without a need for a separate mechanical device in case of a failure of a steering system of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Exemplary embodiments of the present disclosure will be described below with reference to the accompanying drawings, and here, similar reference numerals represent similar elements, but the present disclosure is not limited thereto.

FIG. 1 is a diagram illustrating a state in which a negative scrub radius is applied when bias braking power is applied to a vehicle.

FIGS. 2 to 4 are diagrams for describing a scrub radius, and FIG. 2 illustrates a zero scrub radius, FIG. 3 illustrates a positive scrub radius, and FIG. 4 illustrates a negative scrub radius.

FIG. 5 is a diagram schematically illustrating a configuration of a target steering control system using biased braking power in case of a steering system failure according to the present disclosure.

FIG. 6 is a diagram illustrating a state in which a positive scrub radius is applied by the target steering control system using biased braking power in case of a steering system failure according to the present disclosure when the biased braking power is applied to a vehicle.

FIG. 7 is a flowchart sequentially illustrating in a process of a target steering control method using biased braking power in case of a steering system failure according to the present disclosure.

FIG. 8 is a diagram schematically illustrating a mechanism of switching a negative scrub radius to a positive scrub radius through height control of a suspension in a fourth step in a process of the target steering control method using biased braking power in case of a steering system failure according to the present disclosure.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a preferred exemplary embodiment of a system and a method for target steering control using biased braking power in case of a steering system failure according to the present disclosure will be described in detail with reference to the accompanying drawings. For reference, terms and words used in the present specification and claims should not be interpreted as being limited to typical or dictionary meanings, but should be interpreted as having meanings and concepts which comply with the technical spirit of the present disclosure, based on the principle that an inventor can appropriately define the concept of the term to describe his/her own invention in the best manner. Further, configurations illustrated in the exemplary embodiments and drawings disclosed in the present specification are only the most preferred embodiment of the present disclosure and do not represent all of the technical spirit of the present disclosure, and thus it is to be understood that various equivalents and modified examples, which may replace the configurations, are possible when filing the present application.

The present disclosure is to emergently steer the vehicle so as to urgently move the vehicle to a shoulder of a road when a steering system abruptly fails while the vehicle is driven.

That is, according to the present disclosure, when the steering system fails, a driver may not adjust a direction of the vehicle, so the vehicle is rotated in one direction by biased braking of applying braking power only to a wheel positioned at one side of the vehicle to emergently steer the vehicle.

FIGS. 2 to 4 are diagrams for describing a scrub radius, and FIG. 2 illustrates a zero scrub radius, FIG. 3 illustrates a positive scrub radius, and FIG. 4 illustrates a negative scrub radius.

The scrub radius is also referred to as kingpin offset, and refers to a distance between a point where a central line of a tire T (or wheel) meets a ground surface, and a point where a line SA (an extension line of a kingpin central line) extended through a steering axis meets a road surface.

The scrub radius is determined by an inclination angle of a steering axis, and a camber, and becomes a torque arm to which a friction force generated between the tire and the road surface is applied.

The smaller the scrub radius, the smaller a load applied to each component of the steering device, but a force required for steering increases.

(1) Zero Scrub Radius

The zero scrub radius refers to a state in which an intersection where the central line of the tire T and the extension line SA extended through the steering axis are intersected meets the road surface.

When an offset is given as in the positive scrub radius and the negative scrub radius, biasing in one direction upon braking may not be avoided.

However, in the case of the zero scrub radius, since a force applied horizontally is uniform, such a biasing phenomenon may be prevented.

On the contrary, the tire (wheel) may not draw a circle trajectory around a kingpin during steering, and the vehicle should be directly steered at a contact point.

Therefore, a great force is required to steer when stopping.

(2) Positive Scrub Radius

The positive scrub radius refers to a state in which an intersection where the central line of the tire T and the extension line SA extended through the steering axis are intersected is positioned below the road surface.

The positive scrub radius is applied so that the tire (wheel) is widened from the inside to the outside upon braking.

When friction coefficients between the road surface and left and right wheels are different, a wheel having a larger friction coefficient is more widened outward.

Therefore, the driver should manipulate a steering handle in an opposite direction in order to prevent deviation from a traffic lane upon braking.

(3) Negative Scrub Radius

The negative scrub radius refers to a state in which an intersection where the central line of the tire T and the extension line SA extended through the steering axis are intersected is positioned above the road surface.

Since a rotation point is positioned outside the tire (wheel) in the negative scrub radius, the tire operates to be steered from the outside to the inside upon braking.

When the friction coefficients between the road surface and the left and right wheels are different, the wheel having the larger friction coefficient is more steered inward, so the automobile may maintain a driving traffic lane as it is.

Therefore, it is not necessary for the driver to manipulate the steering handle upon braking.

FIG. 5 is a diagram schematically illustrating a configuration of a target steering control system using biased braking power in case of a steering system failure according to the present disclosure and FIG. 6 is a diagram illustrating a state in which a positive scrub radius is applied by the target steering control system using biased braking power in case of a steering system failure according to the present disclosure when the biased braking power is applied to a vehicle.

The target steering control system using biased braking power in case of a steering system failure according to the present disclosure is configured to include a steering control unit 10, an integrated control unit 20, a suspension control unit 30, and a braking control unit 40.

The steering control unit 10 controls a steering system by receiving information on a steering angle according to a steering will of the driver or a target steering will of the autonomous vehicle.

The steering system is a system that changes the steering angle of the wheel based on a rotational force which the driver applies to a steering wheel, and all components manipulated when the driver arbitrarily steers belong to the steering system.

The steering system is constituted by the steering handle, a steering shaft, etc., to transmit the steering force of the driver to a gear device, and is constituted by the gear device that changes a direction of the steering force and simultaneously, increases the rotational force, and transmits the increased rotational force to a driving link mechanism, and a link mechanism that transmits an operation of the gear device to the wheel and correctly supports a relational location of the left and right wheels.

The integrated control unit 20, as a main control unit, receives steering failure information of the steering system from the steering control unit 10 in case of the failure of the steering system, and input with the target steering angle from the steering wheel of the driver or the autonomous vehicle, and calculates a target biased braking torque value for satisfying the input target steering angle.

In this case, when the target steering angle is input from the steering wheel of the driver, a wheel sensor senses that the driver rotates the steering wheel in order to emergently steer the vehicle to the shoulder of the road, and the wheel sensor transmits a sensing signal to the integrated control unit.

It may be configured in such a form in which when the target steering angle is input from the autonomous vehicle, a driving state of the vehicle and various surrounding information are acquired from various sensors and transmitted to a controller, and calculates the target steering angle for emergently steering the vehicle to the shoulder of the road by the controller and transmitted to the integrated control unit 20.

When the integrated control unit 20 is input with the target steering angle from the steering wheel of the driver or the autonomous vehicle, the integrated control unit 20 calculates a target yaw moment of the vehicle for judging how the vehicle should be rotated in order to emergently steer the vehicle.

In this case, the target yaw moment of the vehicle may be calculated by using a 3-degree of freedom transverse vehicle dynamic state spatial model equation, and since design and analysis of a dynamic prediction model using the state spatial model may be performed by using a computer numerical analysis program, a detailed description thereof is omitted.

Meanwhile, when the target yaw moment of the vehicle is calculated, the integrated control unit 20 calculates which degree the biased braking power required for the vehicle by the following equation.

$$\text{Biased braking power} = \frac{\text{Vehicle target yaw moment}}{\dfrac{\text{Vehicle width}}{2}}$$

The integrated control unit 20 calculates each of a braking torque of a front wheel and a rear wheel at one side of the vehicle according to the target yaw moment.

In this case, a vehicle width is a distance between centers of two wheels constituting the front wheel or the rear wheel.

The biased braking power applied to the vehicle may vary depending on the target yaw moment of the vehicle.

The braking control unit 40 controls a braking actuator of the vehicle and biased-brakes the vehicle in order to satisfy the target biased braking torque by receiving the target biased braking torque value calculated by the integrated control unit 20.

The braking control unit 40 controls the operation of the braking actuator that brakes each of the front wheel and the rear wheel according to braking torque values of the front wheel and the rear wheel transmitted from the integrated control unit 20.

In this case, the braking control unit 40 and the braking actuator may be provided for each wheel.

When the biased braking power is generated in the vehicle by the braking control unit 40, the suspension control unit 30 receives the signal from the integrated control unit 20 to control the height of the suspension to be increased in order to reduce the yaw motion of the vehicle.

The suspension controlled by the suspension control unit 30 is preferably configured by an electronic control type suspension including an electronic self-leveling air suspension.

Meanwhile, when the steering system is in a normal state, the negative scrub radius is maintained, and when the steering system is in a failure state, the negative scrub radius is switched to the positive scrub radius if the height of the suspension is increased by the suspension control unit 30.

Each of the steering control unit 10, the integrated control unit 20, the suspension control unit 30, and the braking control unit 40 is preferably configured by an electronic control unit (ECU).

As another exemplary embodiment, the present disclosure as a target steering control system that receives the target steering angle and generates the target biased braking torque in order to follow up the target steering of the driver or the autonomous vehicle when the steering system fails may be configured to maintain the negative scrub radius when the steering system in a normal operation state, and reduce the negative scrub radius by increasing the height of the suspension and gradually switch the scrub radius to the positive scrub radius when controlling the yaw motion of the vehicle using the biased braking power when the steering system is in a failure state.

As yet another exemplary embodiment, the present disclosure includes the steering control unit 10 controlling a steering system by receiving the information on the steering angle according to the steering will of the driver or the target steering will of the autonomous vehicle, the integrated control unit 20 receiving steering failure information of the steering system from the steering control unit 10, input with the target steering angle from the steering wheel of the driver or the autonomous vehicle, and calculating the target biased braking torque value for satisfying the target steering angle when the steering system fails, the braking control unit 40 receiving the target biased braking torque value calculated by the integrated control unit 20, and biased-braking the vehicle by controlling the braking actuator of the vehicle in order to satisfy the target biased braking torque, and the suspension control unit 30 receiving the signal from the integrated control unit 20 and controlling the height of the suspension to be increased when the biased braking power is generated in the vehicle by the control of the braking control unit 40 in order to reduce a yaw motion of the vehicle, and may also be configured to maintain the negative scrub radius when the steering system in a normal operation state, and reduce the negative scrub radius by increasing the height of the suspension and gradually switch the scrub radius to the positive scrub radius when controlling the yaw motion of the vehicle using the biased braking power when the steering system is in a failure state.

FIG. 7 is a flowchart sequentially illustrating a process of target steering control method using biased braking power in case of a steering system failure according to the present disclosure and FIG. 8 is a diagram schematically illustrating a mechanism of switching a negative scrub radius to a positive scrub radius through height control of a suspension in a fourth step in a process of the target steering control method using biased braking power in case of a steering system failure according to the present disclosure.

A target steering control method using biased braking power in case of a steering system failure according to the present disclosure includes a first step S1 of inputting a target steering angle according to a steering will of a driver or a target steering will of an autonomous vehicle into an integrated control unit, a second step S2 of delivering steering failure information of a steering system from a steering control unit to an integrated control unit, and judging, by the integrated control unit, whether the steering system fails, a third step S3 of operating, by a braking control unit receiving a signal from the integrated control unit, a steer-by-brake using biased braking when the steering system fails in the second step S2, and a fourth step S4 of switching a negative scrub radius R1 to a positive scrub radius R2 through suspension height control by control of a suspension control unit by receiving the signal from the integrated control unit when the biased braking power occurs in a vehicle by the braking control unit.

Here, in the case of the negative scrub radius R1, reference numeral a represents a height of a steering axis, and reference numeral c represents a point where a line extended through the steering axis and a center line TC of a tire T meet.

Further in the case of the positive scrub radius R2, reference numeral b represents the height of the steering axis, and reference numeral d represents a point where the line extended through the steering axis and the center line TC of the tire T meet.

Reference numeral h represents a difference between the height a of the steering axis (the height of the suspension) in the case of the negative scrub radius R1 and the height b of the steering axis in the case of the positive scrub radius R2.

In this case, in the case of the negative scrub radius R1, an intersection where the center line TC of the tire T and the extension line extended through the steering axis are intersected is positioned above a road surface G and in the case of the positive scrub radius R2, the intersection where the center line TC of the tire T and the extension line extended through the steering axis are intersected is positioned below the road surface G.

Meanwhile, the integrated control unit is input with the target steering angle from the steering wheel of the driver or the autonomous vehicle, and calculates the target biased braking torque value for satisfying the target steering angle.

The braking control unit controls a braking actuator of the vehicle and biased-brakes the vehicle in order to satisfy the target biased braking torque by receiving the target biased braking torque value calculated by the integrated control unit.

When the target steering angle is not input into the integrated control unit. In the first step S1 of the control method, the negative scrub radius R1 is maintained and when the integrated control unit judges that the steering system does not fail in the second step S2, the negative scrub radius R1 is maintained.

When the braking control unit does not operate the steer-by-brake using biased braking, in the third step S3, the negative scrub radius R1 is maintained.

As still yet another exemplary embodiment, the present disclosure as a target steering control method that receives the target steering angle and generates the target biased braking torque in order to follow up the target steering of the driver or the autonomous vehicle when the steering system fails may be configured to maintain the negative scrub radius R1 when the steering system in a normal operation state, and reduce the negative scrub radius R1 by increasing the height of the suspension and gradually switch the scrub radius to the positive scrub radius R2 when controlling the yaw motion of the vehicle using the biased braking power when the steering system is in a failure state.

As still yet another exemplary embodiment, the present disclosure includes a step in which the steering control unit receiving the information on the steering angle according to the steering will of the driver or the target steering will of the autonomous vehicle control the steering system, a step of delivering steering failure information of the steering system to the integrated control unit from the steering control unit when the steering system fails, and inputting with, by the integrated control unit, the target steering angle from the steering wheel of the driver or the autonomous vehicle, and calculating the target biased braking torque value for satisfying the target steering angle, a step of delivering the target biased braking torque value calculated by the integrated control unit to the braking control unit, and biased-braking, by the braking control unit, the vehicle by controlling the braking actuator of the vehicle in order to satisfy the target biased braking torque, and a step of receiving the signal from the integrated control unit and controlling, by the suspension control unit, the height of the suspension to be increased when the biased braking power is generated in the vehicle by the control of the braking control unit in order to reduce a yaw motion of the vehicle, and may also be configured to maintain the negative scrub radius R1 when the steering system in a normal operation state, and reduce the negative scrub radius R1 by increasing the height of the suspension and gradually switch the scrub radius to the positive scrub radius R2 by receiving the signal of the integrated control unit when controlling the yaw motion of the vehicle using the biased braking power when the steering system is in a failure state.

As such, according to the present disclosure, there is an effect in that a braking control unit controls a braking actuator of a vehicle and biased-brakes the vehicle in order to satisfy a target biased braking torque by receiving a target biased braking torque value calculated by an integrated control unit, and when biased braking power is generated in the vehicle by the braking control unit, a suspension control unit receives a signal from the integrated control unit to control a height of a suspension to be increased in order to reduce a yaw motion of the vehicle, thereby stably emergently steering the vehicle using biased braking power without a need for a separate mechanical device in case of a failure of a steering system of the vehicle.

The aforementioned present invention is not limited to the aforementioned embodiments and the accompanying drawings, and it will be obvious to those skilled in the technical field to which the present disclosure pertains that various substitutions, modifications, and changes may be made within the scope without departing from the technical spirit of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for target steering control using biased braking power in case of a steering system failure, the system comprising:

a steering control unit controlling a steering system by receiving information on a steering angle according to a steering will of a driver or a target steering will of an autonomous vehicle;

an integrated control unit receiving steering failure information of the steering system from the steering control unit, input with the target steering angle from the steering wheel of the driver or the autonomous vehicle, and calculating a target biased braking torque value for satisfying the target steering angle when the steering system is in a failure state;

a braking control unit receiving the target biased braking torque value calculated by the integrated control unit, and biased-braking a vehicle by controlling a braking actuator of the vehicle in order to satisfy the target biased braking torque; and a suspension control unit receiving a signal from the integrated control unit and controlling a height of a suspension to be increased when biased braking power is generated in the vehicle by the braking control unit in order to reduce a yaw motion of the vehicle, wherein when the integrated control unit is input with the target steering angle from the steering wheel of the driver or the autonomous vehicle, the integrated control unit calculates a target yaw moment of the vehicle for judging how the vehicle should be rotated in order to emergently steer the vehicle, and wherein when the target yaw moment of the vehicle is calculated, the integrated control unit calculates which degree the biased braking power required for the vehicle by the following equation:

$$\text{Biased braking power} = \frac{\text{Vehicle target yaw moment}}{\frac{\text{Vehicle width}}{2}}.$$

2. The system of claim 1, wherein the integrated control unit calculates each of a braking torque of a front wheel and a rear wheel at one side of the vehicle according to the target yaw moment.

3. The system of claim 2, wherein the braking control unit controls the operation of the braking actuator that brakes each of the front wheel and the rear wheel according to braking torque values of the front wheel and the rear wheel transmitted from the integrated control unit.

4. The system of claim 3, wherein the braking control unit and the braking actuator are provided for each wheel.

5. The system of claim 1, wherein when the steering system is in a normal state, a negative scrub radius is maintained.

6. The system of claim 1, wherein when the steering system is in a failure state, if the height of the suspension is increased by the suspension control unit, a negative scrub radius is switched to a positive scrub radius.

7. The system of claim 1, wherein the steering control unit, the integrated control unit, the braking control unit, and the suspension control unit are configured by an electronic control unit (ECU).

8. The system of claim 1, wherein the target yaw moment of the vehicle is calculated by using a 3-degree of freedom transverse vehicle dynamic state spatial model equation.

9. A system for target steering control using biased braking power in case of a steering system failure, the system comprising:

a steering control unit controlling a steering system by receiving information on a steering angle according to a steering will of a driver or a target steering will of an autonomous vehicle;

an integrated control unit receiving steering failure information of the steering system from the steering control unit, input with the target steering angle from the steering wheel of the driver or the autonomous vehicle, and calculating a target biased braking torque value for satisfying the target steering angle when the steering system fails;

a braking control unit receiving the target biased braking torque value calculated by the integrated control unit, and biased-braking a vehicle by controlling a braking actuator of the vehicle in order to satisfy the target biased braking torque; and a suspension control unit receiving a signal from the integrated control unit and controlling a height of a suspension to be increased when biased braking power is generated in the vehicle by the control of the braking control unit in order to reduce a yaw motion of the vehicle, wherein when the steering system is in a normal operation state, a negative scrub radius is maintained, and the negative scrub radius is reduced by increasing the height of the suspension and the scrub radius is gradually switched to the positive scrub radius when controlling the yaw motion of the vehicle using the biased braking power when the steering system is in a failure state, wherein when the integrated control unit is input with the target steering angle from the steering wheel of the driver or the autonomous vehicle, the integrated control unit calculates a target yaw moment of the vehicle for judging how the vehicle should be rotated in order to emergently steer the vehicle, and wherein when the target yaw moment of the vehicle is calculated, the integrated control unit calculates which degree the biased braking power required for the vehicle by the following equation:

$$\text{Biased braking power} = \frac{\text{Vehicle target yaw moment}}{\dfrac{\text{Vehicle width}}{2}}.$$

10. A method for target steering control using biased braking power in case of a steering system failure, the method comprising:

a first step of inputting a target steering angle according to a steering will of a driver or a target steering will of an autonomous vehicle into an integrated control unit;

a second step of delivering steering failure information of a steering system from a steering control unit to an integrated control unit, and judging, by the integrated control unit, whether the steering system fails;

a third step of operating, by a braking control unit receiving a signal from the integrated control unit, a steer-by-brake using biased braking when the steering system fails in the second step; and a fourth step of switching a negative scrub radius to a positive scrub radius through suspension height control by control of a suspension control unit by receiving the signal from the integrated control unit when the biased braking power occurs in a vehicle by the braking control unit, wherein in the first step, if the target steering angle is not input into the integrated control unit, the negative scrub radius is maintained.

11. The method of claim 10, wherein the integrated control unit is input with the target steering angle from the steering wheel of the driver or the autonomous vehicle, and calculates the target biased braking torque value for satisfying the target steering angle.

12. The method of claim 11, wherein the braking control unit receives the target biased braking torque value calculated by the integrated control unit, and biased-brakes a vehicle by controlling a braking actuator of the vehicle in order to satisfy the target biased braking torque.

13. The method of claim 10, wherein in the second step, when the integrated control unit judges that the steering system does not fail, the negative scrub radius is maintained.

14. The method of claim 10, wherein in the third step, when the braking control unit does not operate steer-by-brake using biased braking, the negative scrub radius is maintained.

* * * * *